United States Patent
Izumi et al.

(10) Patent No.: US 6,816,279 B1
(45) Date of Patent: Nov. 9, 2004

(54) NETWORK, SYSTEM, AND DIGITAL APPARATUSES INTERCONNECTED BY A NETWORK

(75) Inventors: Hirokazu Izumi, Nara (JP); Harumi Tomota, Yamatokoriyama (JP); Masashi Tanimoto, Yamatokoriyama (JP)

(73) Assignee: Sharp Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/411,770

(22) Filed: Oct. 4, 1999

(30) Foreign Application Priority Data

Oct. 26, 1998 (JP) .......................................... 10-303641

(51) Int. Cl.⁷ .............................................. G06F 15/00
(52) U.S. Cl. .................... 358/1.16; 358/1.14; 358/1.15; 358/527; 358/537
(58) Field of Search ............................. 358/1.16, 1.14, 358/1.15, 1.2, 527, 537, 296, 500–502; 399/8; 355/200, 202, 204

(56) References Cited

U.S. PATENT DOCUMENTS

| | | | |
|---|---|---|---|
| 4,733,349 A | * | 3/1988 | Sumiyoshi et al. ......... 711/159 |
| 5,689,755 A | * | 11/1997 | Ataka .............................. 399/8 |
| 5,854,693 A | * | 12/1998 | Yoshiura et al. ............. 358/468 |
| 6,067,168 A | * | 5/2000 | Nishiyama et al. ......... 358/1.16 |
| 6,330,068 B1 | * | 12/2001 | Matsuyama ................. 358/1.14 |

* cited by examiner

Primary Examiner—Twyler Lamb
(74) Attorney, Agent, or Firm—David G. Conlin, Esq.; John J. Penny, Jr.; Edwards & Angell, LLP

(57) ABSTRACT

A network system includes a plurality of printers and a digital copying machine interconnected through a data transmission line, detects a free space in an image memory of each printer, adds a user identification code to image data of a document read in an image reading section of the digital copying machine, and then sends the image data to a printer with the image memory having a sufficient free space so as to store the image data. With this structure, even if the digital copying machine does not have an image memory, it is possible to store the image data subjected to an image formation within the network and omit an image reading process when performing an image formation according to the same image data later. Moreover, with this structure, various processing can be executed on the image data by effectively using the functions of the respective apparatuses.

11 Claims, 6 Drawing Sheets

FIG. 4

| PRINTER ID OF PRINTER 3a | PRINTER ID OF PRINTER 3b | PRINTER ID OF PRINTER 3c | PRINTER ID OF PRINTER 3n |
|---|---|---|---|
| PRIORITY ORDER OF PRINTER 3a | PRIORITY ORDER OF PRINTER 3b | PRIORITY ORDER OF PRINTER 3c | PRIORITY ORDER OF PRINTER 3n |

41

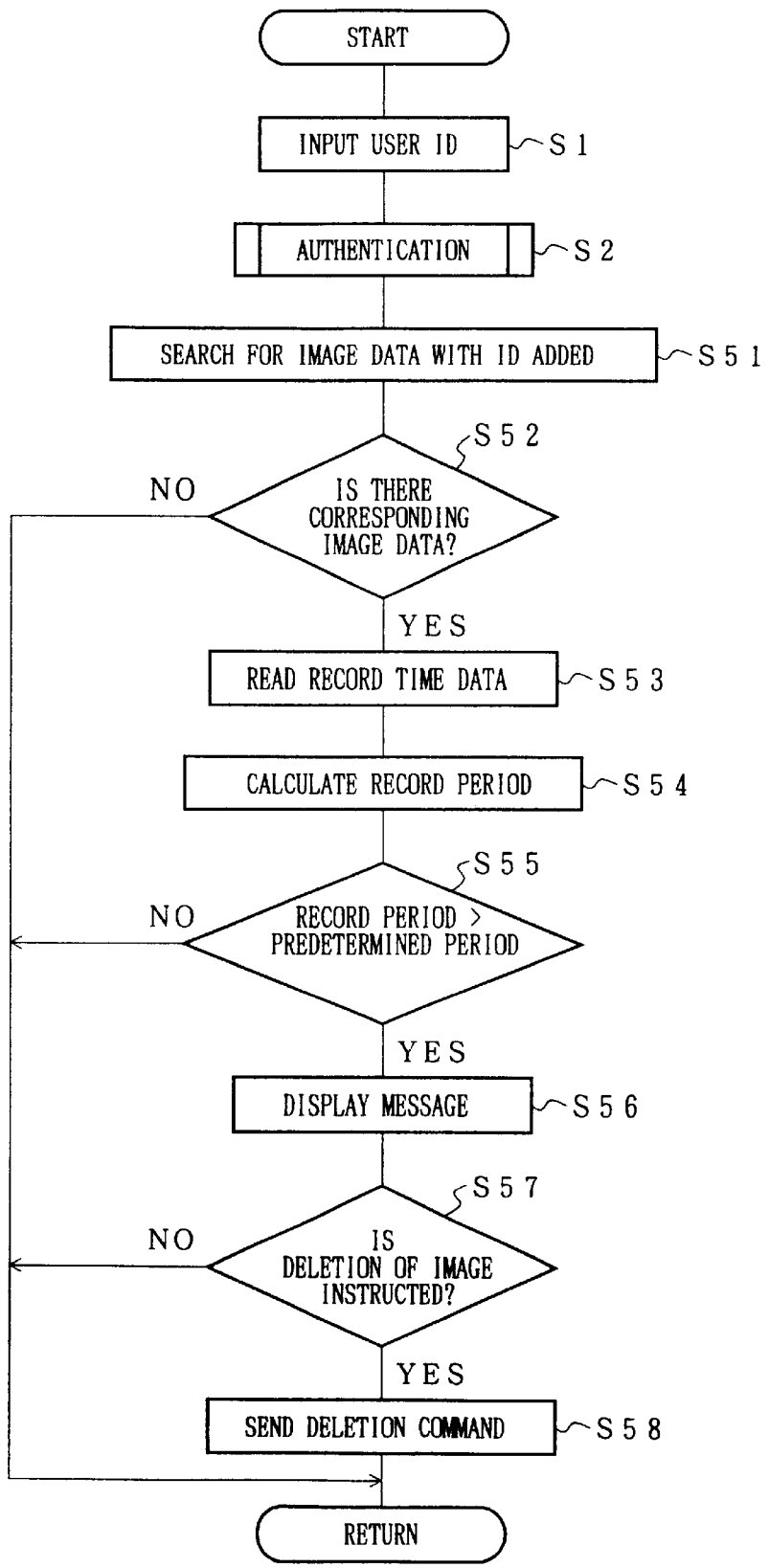

NETWORK, SYSTEM, AND DIGITAL APPARATUSES INTERCONNECTED BY A NETWORK

FIELD OF THE INVENTION

The present invention relates to a network system for connecting a digital copying machine and an external device through a data transmission line, for inputting and outputting image data therebetween, and digital apparatuses interconnected by a network.

BACKGROUND OF THE INVENTION

Conventionally, a network system including a digital copying machine and external devices, such as a personal computer and a printer, interconnected has been known. Such a digital copying machine reads an image on a document by an image reading section (image taking section), and executes an image formation according to the read image data.

Such a digital copying machine performs not only a copying function, but also a plurality of functions, such as a printer function of forming an image according to image data input from the external device and a scanner function of outputting the image data read from the document to the external device, by sending and receiving the image data to/from the external device through a data transmission line.

However, the conventional network systems suffer from the following problems. Specifically, some digital copying machines do not have a large-capacity image memory for storing all the image data read by the image reading section. With a network system including such a digital copying machine which does not have a large-capacity image memory, the processing executable to the image data of the document read by the digital copying machine is considerably limited, and thus there is a problem that the functions of the devices constituting the network system are not used effectively.

In order to avoid such problems, U.S. Pat. No. 5,854,693 (Filed: Jan. 7, 1997, Date of Patent: Dec. 29, 1998) discloses an image forming system including an image forming apparatus, such as a digital copying machine, and a plurality of external devices (for example, a printer) which have image memories and are connected to the image forming apparatus through an interface. In this system, if the free space (available memory area) in the memory is less than a memory capacity necessary for reading a remaining document when reading the document in the image forming apparatus, the image data exceeding the free space is transferred to the image memory of an external device through the interface to record the image data.

However, with the above system, when the image data are sent to and recorded in the image memory of the external device through the interface more than one time, it is difficult to identify each image data and accurately retrieve each image data recorded in the image memory of the external device.

Moreover, with the above system, since the image data is divided and separately recorded in the image forming apparatus and the external device, it is necessary to call the respective divided image data and sort them in order when executing an image formation by gathering the divided image data. Thus, there is a problem that it takes a long time for the image formation.

SUMMARY OF THE INVENTION

An object of the present invention is to provide a network system and digital apparatuses interconnected by a network, capable of executing various processing on image data of a document read by a digital copying machine having no image memory by effectively using the function of each device and of easing a search for each image data and an image formation from the image data, by recording the image data of the document in an image memory of another external device within the network system to reduce the repetition of the reading of the image data from the document.

In order to achieve the above object, a network system according to the present invention detects whether there is a free space in an image memory of an external device, adds an identification data for identifying image data read from a document by a digital copying machine to the image data during an image formation according to the image data of the document in the digital copying machine, and records the image data with the added identification data in the image memory of the external device, which has a free space.

With the above system, the image data relating to an image formation in the digital copying machine can be recorded collectively with the identification data added thereto in the image memory of the external device within the network.

Therefore, even if the digital copying machine itself does not include an image memory having a sufficient capacity for recording the image data of the document, since the image data read by the digital copying machine is recorded in another device within the network after adding the identification data to the image data, it is possible to search for and call the image data easily by the identification data and execute the image formation by eliminating the necessity of reading the image of the document again in performing an image formation according to the same image data later. Thus, with this system, the image formation can be simplified, and the time taken for the image formation can be shortened.

In this system, the identification data preferably includes a user identification code (hereinafter referred to as the "user ID (identification)") for identifying an operator who operates the digital copying machine.

With this system, a user ID for identifying an operator who instructs the execution of an image formation according to the image data to be recorded in the image memory of the external device is added to the image data. Therefore, it is possible to identify the image data recorded in the image memory of the external device for the purpose of judging whether an image formation is available, on the basis of the user ID which is to be input first by the operator when performing an image formation.

Consequently, with the above system, it is possible to eliminate the process of additionally creating data for identifying the image data and facilitate a search for the image data recorded in the image memory of the external device.

In this system, when an image recording process for recording the image data in the image memory of the external device is not completed, it is preferred to arrange reading of the image data from the document in the digital copying machine and the image recording process to another external device to be executed again.

With this system, when the recording of the image data subjected to an image formation in the digital copying machine in the external device can not be completed properly due to some reasons such as a shortage of the free space in the image memory in the course of the process, the reading of the image data from the document in the digital copying machine is executed again, and the read image data is recorded in the image memory of another external device, which has a sufficient free space for the data volume. Thus, since the image recording process can be executed again without recording the image of a single image data over two image memories, the image data can be surely recorded.

In this system, the digital copying machine is preferably arranged to detect a free space in the image memory for each of a plurality of the external devices, according to a preset priority order.

With this system, the detection of a free space in the image memory of each of the external devices is performed according to the preset priority order. Hence, by setting the priority order for each external device by considering the convenience of the management of the image data, the image data can be recorded in a state suitable for the management in the external device. Consequently, with this system, the management of the recorded image data can be eased by the setting of the priority order.

In this system, it is preferred to arrange the digital copying machine to calculate a data volume of the image data of the document in advance and record the image data in an image memory having a sufficient free space for the calculated data volume.

According to this system, by calculating the data volume of the image data of the document in advance, the image data is recorded in the image memory having a free space sufficient for the data volume of the image data to be recorded.

This system prevents a shortage of a free space in the image memory in the course of the image recording process and ensures a completion of the image recording operation, thereby improving the operation efficiency of the digital copying machine.

In this system, it is preferred to compare a record period from the record time of the image data recorded in the image memory of the external device to the current time with a preset predetermined period (specified period), and selectively delete the image data whose record period exceeds the predetermined period.

With this system, the image data which has been recorded in the image memory of the external device in a period of time longer than the predetermined period is selectively deleted. It is therefore possible to prevent the memory area in the image memory of the external device from being occupied by unnecessary image data. Consequently, this system can use the image memory of the external device properly as the recording function of the external device.

For a fuller understanding of the nature and advantages of the invention, reference should be made to the ensuing detailed description taken in conjunction with the accompanying drawings.

BRIEF DESCRIPTION OF THE DRAWINGS

FIG. 4 is an explanatory view showing an example of a table recording the relationship between the printer ID of each of a plurality of printers used for the processing and the priority order.

FIG. 6 is a flow chart showing a fourth example of each processing procedure of the CPU of the digital copying machine included in the network system.

DESCRIPTION OF THE PREFERRED EMBODIMENT

Figure 1:
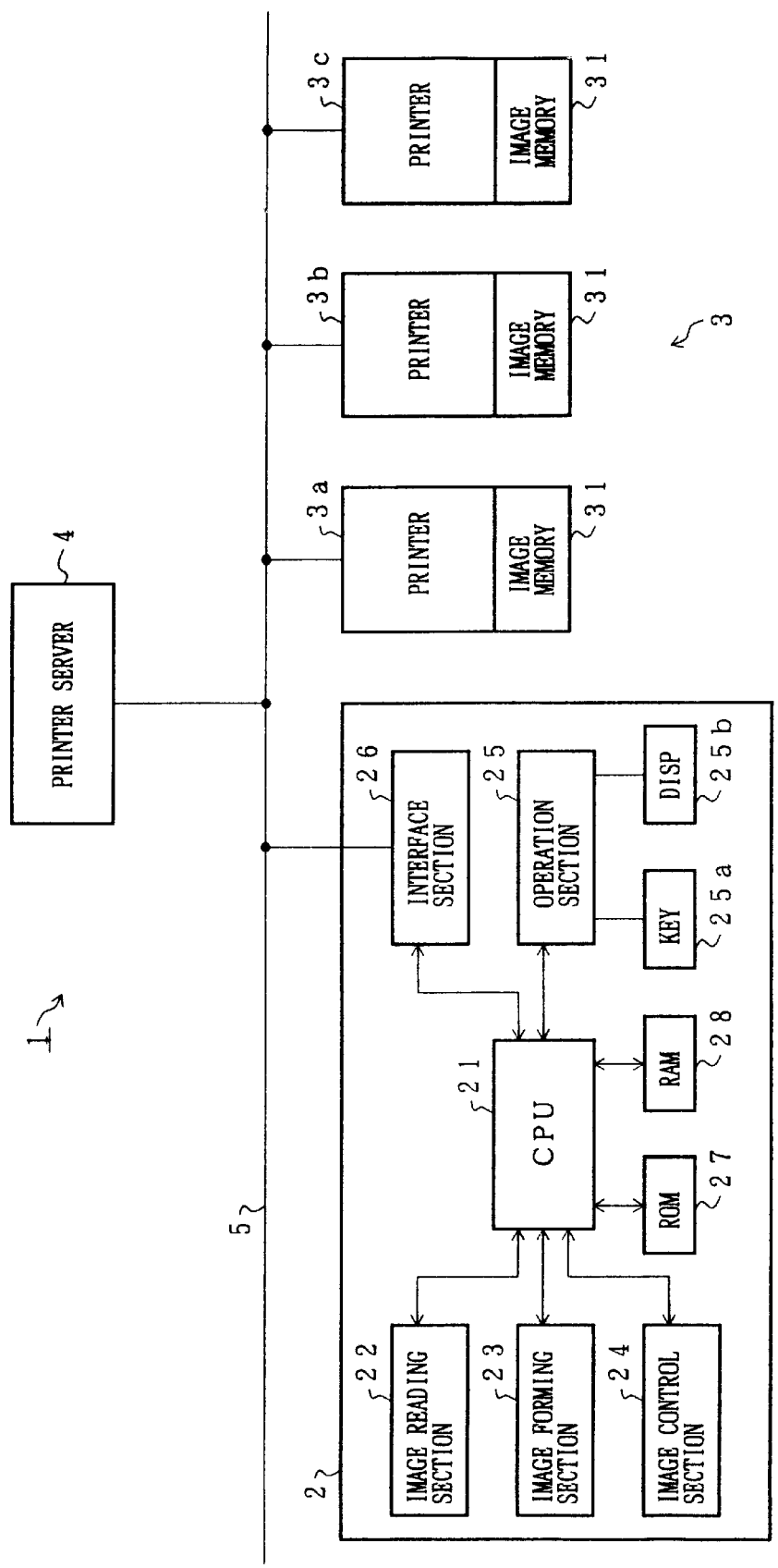
FIG. 1 is a block diagram showing a structure of an embodiment of a network system according to the present invention.

FIG. 1 is a block diagram showing the structures of a network system and digital apparatuses interconnected by a network, according to an embodiment of the present invention. A network system 1 includes a digital copying machine 2 having no image memory, a plurality of printers 3 ($3a$, $3b$, $3c$, ...) as external devices having an image memory 31, and a printer server 4, which are interconnected through a data transmission line 5 such as a LAN (Local Area Network) cable.

The digital copying machine 2 includes an image reading section 22, an image forming section 23, an image control section 24, and an operation section 25. The image reading section 22 reads optically an image on a document placed on a platen, converts it into image data (digital data) corresponding to the image, and outputs the data. The image forming section 23 executes an image formation according to the image data. The image control section 24 performs predetermined image processing on the image data. The operation section 25 includes a key 25a for selecting processing functions to be executed to the image data and for accepting (inputting) settings of processing conditions, and a display 25b for displaying a message indicating the operating states, etc. of the digital copying machine 2 on the screen.

Moreover, the digital copying machine 2 is provided with a CPU (Central Processing Unit) 21 for generalizing these sections 22 to 25 and controlling them respectively. The CPU 21 includes a ROM (Read Only Memory) 27 and a RAM (Random Access Memory) 28, in which programs for the control are stored in advance. Further, the CPU 21 is connected to the data transmission line 5 through an interface section 26. Besides, the CPU 21 has functions as a later-described detecting section, adding section, and control section.

Figure 2:
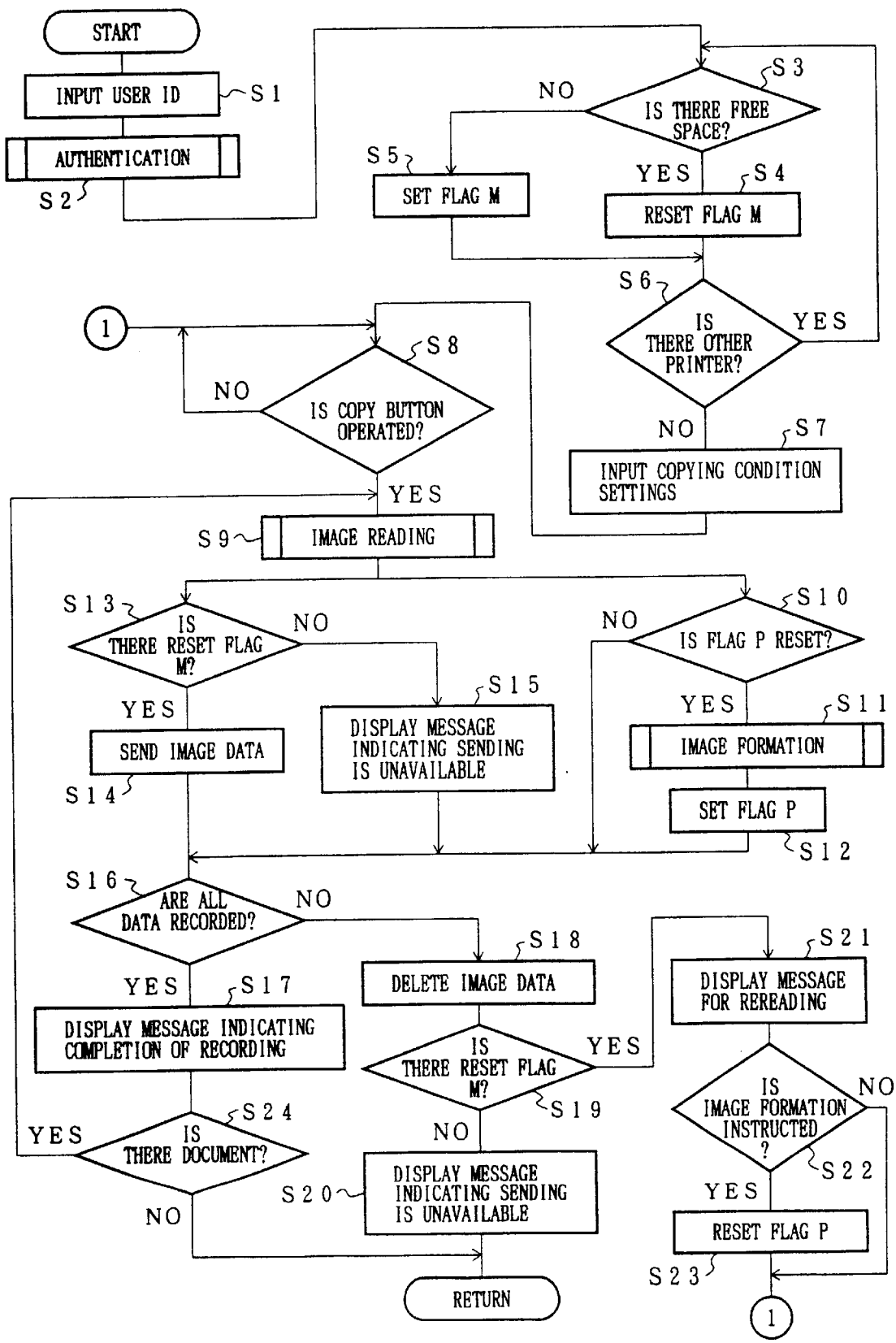
FIG. 2 is a flow chart showing a first example of each processing procedure of a CPU of a digital copying machine included in the network system.

FIG. 2 is a flow chart showing a first example of each processing procedure of the CPU 21 of the digital copying machine 2 included in the network system 1. When the digital copying machine 2 is warmed up after being switched on, the CPU 21 of the digital copying machine 2 accepts an input of a user ID that identifies an operator (step 1, hereinafter the step will be abbreviated "s"), and then authenticates if the operator has been registered as a person who is allowed to use the digital copying machine 2, based on the input user ID (s2). However, this authentication process is not essential.

When the authentication process in s1 and s2 has been completed, the CPU (detecting section) 21 resets or sets a plurality of flags M (flags Ma, Mb, Mc ...) according to whether there is a free space (available memory area) in the image memory 31 for each of the printers 3 as other devices connected to the network system 1 (s3 to s6). The flags M are allocated to a predetermined memory area in the RAM 28 for the respective printers $3a$ to $3c$. When the flag M is reset, it indicates that there is a free space in the image memory 31. On the other hand, when the flag M is set, it shows there is no free space in the image memory 31.

Next, the CPU 21 accepts the input of settings of copying conditions (s7). When a start of copying is instructed by operating the copy button in the operation section 25 (s8), the CPU 21 performs reading of the image on the document in the image reading section 22 (s9), executes an image formation in the image forming section 23 according to the image data read on a condition that a flag P is reset (s10 and s11), and sets the flag P (s12).

The flag P is allocated to a predetermined memory area in the RAM 28, and stores a state indicating whether the image formation according to the image data of the document read by the image reading section 22 has been performed. When the flag P is reset, it indicates that the image formation of the image data has not been completed. On the other hand, when the flag P is set, it shows that the image formation has been completed.

The CPU 21 executes recording of the image data concurrently with the image formation of s10 to s12. In other words, the CPU 21 checks the contents of the respective flags M (s13), and sends the image data to a printer 3 corresponding to a reset flag among the flags M (a printer having a free space in the image memory 31) (s14). When all of the flags M are set, a message indicating that the image data can not be stored is displayed on the display 25b (s15).

If all the image data corresponding to one page of document can be stored in the image memory 31 of any of the printers 3, the CPU 21 displays on the display 25b a message indicating that the recording of all of the image data has been completed (s16 and s17). On the other hand, if at least a part of the image data corresponding to one page of document can not be recorded, the CPU 21 instructs a deletion of the image data recorded in the image memory 31 of a printer 3 to which the image data was sent (s18). At this time, the CPU 21 searches for another printer 3 having a free space in the image memory 31 by the contents of the rest of the flags M (s19), and displays on the display 25b a message indicating that the image data can not be recorded when there is no other printer 3 having a free space in the image memory 31 (s19→s20).

On the other hand, when there is other printer 3 having a free space in the image memory 31, the CPU 21 displays on the display 25b a message indicating that the reading of the image data of the document is to be executed again (s21), and accepts an input of an instruction indicating whether the image formation for the image data read again is to be executed (s22). Only when the operator instructs the execution of the image formation for the image data read again, the CPU 21 resets the flag P and waits for an operation of the copy button (s22, s23→s8).

The CPU 21 repeatedly executes the processes of s9 to s23 for all the documents set in the image reading section 22 (s24→s9), and deletes the stored contents of the user ID input in s1 upon the completion of the processing for all the documents set in the image reading section 22.

By performing the above-mentioned processes, the digital copying machine 2 of this embodiment can record the image data read from the document, in the image memory 31 of any of the printers 3 connected to the network system 1. Moreover, if the image data of one page of document can not be recorded in the image memory 31 of a single printer 3, the reading of the image data from the document is executed again and recorded in the image memory 31 of another printer 3. Consequently, the read image data can be surely recorded in the image memory 31 of the another printer 3 with a free space, thereby easing the management of the record location of the image data.

In addition, by adding ID data unique to the digital copying machine 2 to the image data to be sent to the printer 3 and by storing in the digital copying machine 2 the relationship between data which specifies the document whose image data has been sent and the ID data which specifies a printer 3 to which the image data has been sent, the reading of the image data recorded in the image memory 31 of any of the printers 3 can be performed easily and accurately by the above-mentioned respective data.

Besides, the recording of the image data read from the document may be executed selectively according to an instruction input by the operator, and a printer 3 to which the image data is to be recorded can be specified by the operator.

In this case, if the printer 3 specified by the operator does not have a free space in the image memory 31, a message indicating this fact is displayed on the display 25b. Then, the CPU 21 selects a printer having a free space in the image memory 31, and displays a message containing information that specifies the selected printer 3 on the display 25b.

Furthermore, if all of the image data read from plural pages of documents set in the image reading section 22 can not be stored in the image memory 31 of a single printer 3 by single image reading, it is possible to easily read all of necessary image data by executing the reading of the image data from all of the plural pages of documents again and always recording the image data of the plural pages of documents which have strong relevance to each other in their contents in the image memory 31 of a single printer 3.

Figure 3:
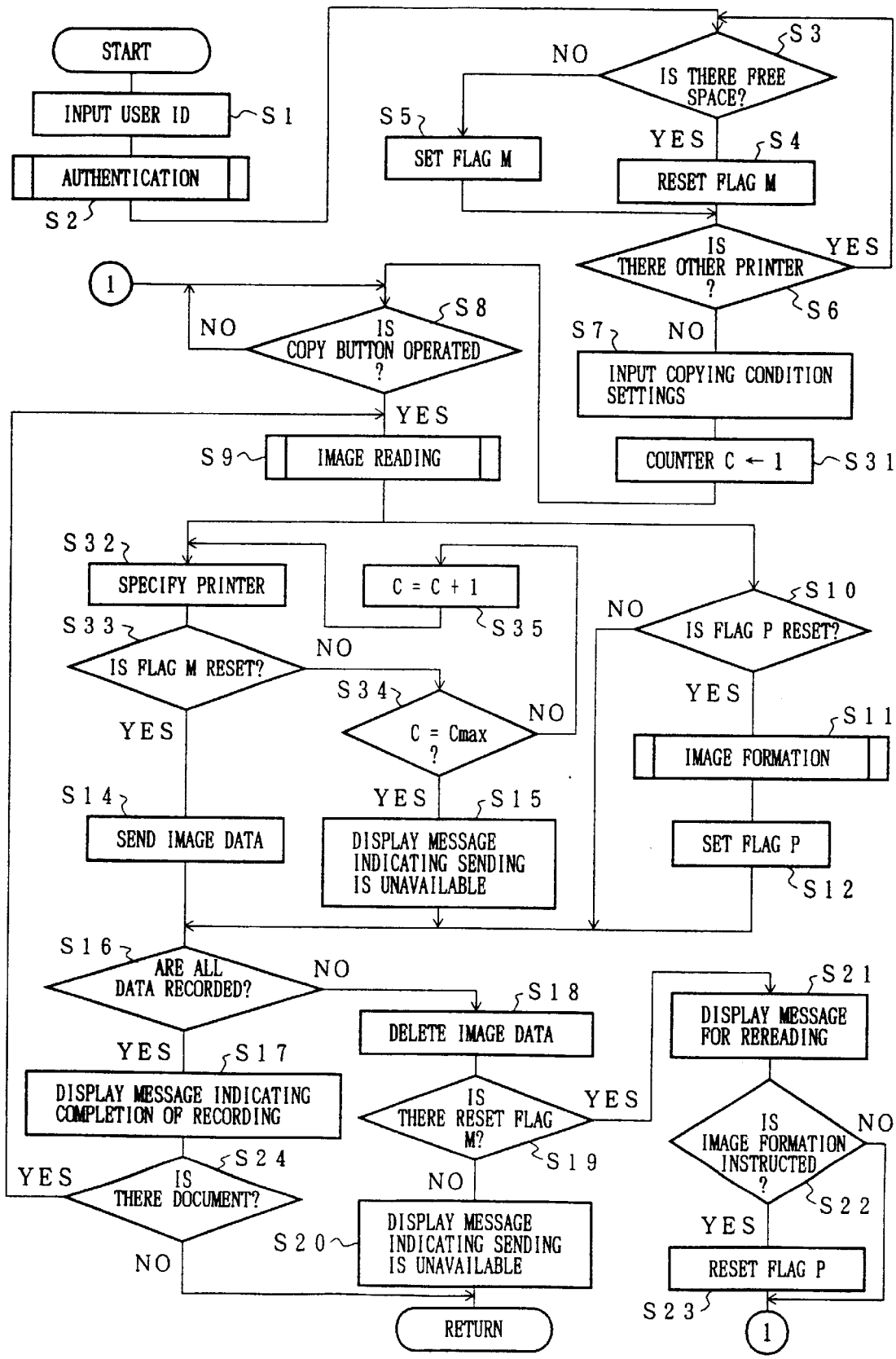
FIG. 3 is a flow chart showing a second example of each processing procedure of the CPU of the digital copying machine included in the network system.

FIG. 3 is a flow chart showing a second example of each processing procedure of the CPU 21 of the digital copying machine 2 included in the network system 1. In the explanation about the second example, the steps of executing the same processes as those in the flow chart shown in FIG. 2 are designated by the same step numbers and the detailed explanation thereof is omitted.

In this example, the priority order of each of the printers 3 included in the network system 1 is determined in advance, and the image data read in the image reading section 22 is sent from the digital copying machine 2 to a printer 3 which is selected on the basis of the priority order and the presence of a free space in the image memory 31 therein.

Therefore, as illustrated in FIG. 4, the CPU 21 stores a table 41 which shows the relationship between the printer ID for identifying each of the printers 3 and the priority order in a predetermined memory area in the RAM 28, and executes the processes of s31 to s34 instead of the processing of s13 shown in FIG. 2. In other words, after completing the input of settings of the copying conditions by the operator, the CPU 21 sets the count value of a counter C for counting the priority order in the predetermined memory area in the RAM 28 to "1", and waits for the operation of the copy button by the operator (s7→s31→s8).

Moreover, in the image recording performed after completing the reading of the image data of one page of document in the image reading section 22 upon the operation of the copy button, the CPU 21, first, searches for a printer ID corresponding to the count value of the counter C from the table 41 to specify a printer 3 to which the image data is to be sent (s32).

Next, the CPU judges whether the flag M corresponding to the specified printer 3 is reset or not (s33). When the flag M corresponding to the specified printer 3 is set, the CPU 21 successively increments the count value of the counter C one by one until the count value reaches the total number Cmax of the printers 3 connected to the network system 1, and then returns to s32 (s34, s35→s32).

When there is a free space in the image memory 31 of the printer 3 specified by the count value of the counter C, the CPU 21 sends the image data to the printer 3 (s33→s14). On the other hand, when the flags M of all the printers 3 connected to the network system 1 are set and thus there is no printer 3 having a free space in the image memory 31, the CPU 21 displays on the display 25b a message indicating that the recording of the image data can not be executed (s33→s15).

By the above-described processes of s32 to s35, the CPU 21 judges whether there is a free space in the image memory 31 for each of the printers 3 connected to the network system 1 on the bases of the preset priority order, and records selectively the image data read by the image reading section 22 to a printer 3 having the highest priority order among the printers 3 having a free space in their image memories 31.

Thus, by setting a priority order corresponding to the management of the image data for each of the printers 3 connected to the network system 1, it is possible to record the image data to a printer 3 which allows easier management of the image data.

Figure 5:
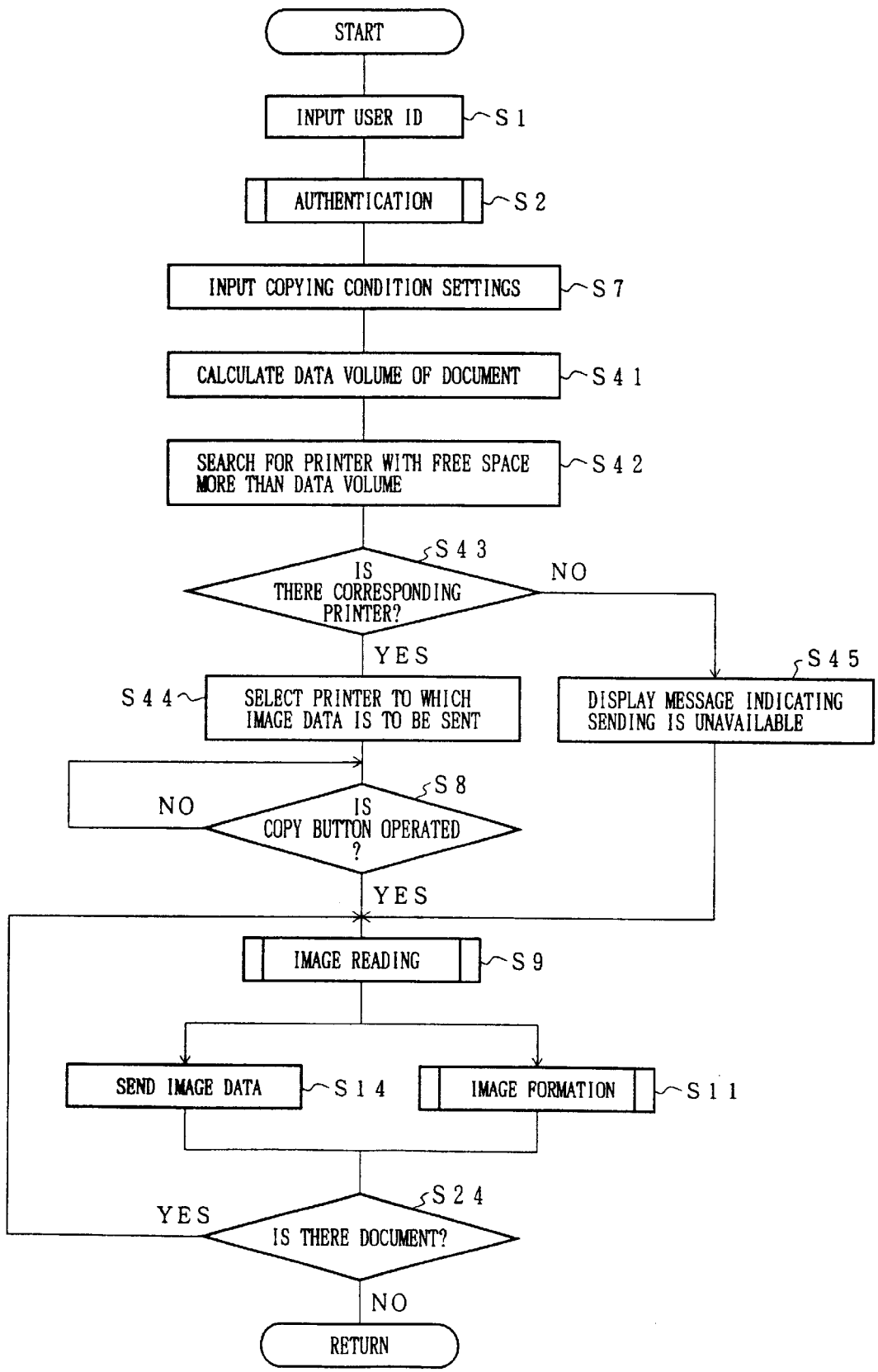
FIG. 5 is a flow chart showing a third example of each processing procedure of the CPU of the digital copying machine included in the network system.

FIG. 5 is a flow chart showing a third example of each processing procedure of the CPU 21 of the digital copying machine 2 included in the network system 1. In the explanation about the third example, the steps of executing the same processes as those in the flow chart shown in FIG. 2 are designated by the same step numbers and the detailed explanation thereof is omitted.

In this example, a printer 3 with the image memory 31 having a free space larger than the data volume of the image data read in the image reading section 22 of the digital copying machine 2 is selected, and the image data is sent to the printer 3.

Therefore, the CPU 21 executes the processes of s41 to s45 shown in FIG. 5, instead of the processing of s3 to s6, s10, s12, s13, and s15 to s23. In other words, after completing normally the authentication of the user ID input by the operator and the input of settings of the copying conditions, the CPU 21 calculates the data volume of the image data of documents subjected to the current reading process from the number of pages of the documents, the document size, the resolution and gradient of the image reading section 22 (s41), and searches for a printer 3 with the image memory 31 having a free space larger than the calculated data volume within the network system (s42).

If there is a printer 3 with the image memory 31 having a free space larger than the calculated data volume, the CPU 21 selects the printer 3 as a printer to which the image data is to be sent (s43 and s44). On the other hand, if there is no printer 3 with the image memory 31 having a free space larger than the calculated data volume, the CPU 21 displays on the display 25b a message indicating that the image data of the documents subjected to the current reading process can not be recorded (s45).

By performing the above-mentioned processes, the image data is sent to a printer 3 with the image memory 31 having a free space sufficient for recording the image data of the documents subjected to the reading, thereby preventing a shortage of memory capacity of the image memory 31 after starting the sending of the image data and avoiding rereading of the image data.

Incidentally, the number of documents and the document size used for the calculation of the data volume of the image data of the documents are used as one of the copying conditions to be input by the operator in s7, and may be counted or detected by a document page counting section and a document size detecting section provided in the digital copying machine 2. Moreover, as the resolution and gradient of the image reading section 22, values which are predetermined by setting or by the structure can be used.

Furthermore, when the actual data volume of the image data (document data) read from the documents is more than the data volume calculated in s41, a shortage of the memory area (memory capacity) of the image memory 31 occurs after starting the sending of the image data. In such a situation, the image data read by the rereading can be sent to a printer 3 with the image memory 31 having a free space larger than the free space of the image memory 31 of the printer 3 selected in s44, or having a free space capable of storing the sum of the free space of the image memory 31 of the printer 3 selected in s44 and a remaining data volume calculated from the number of pages of remaining documents, document size, resolution and gradient.

In addition, it is possible to display a printer ID identifying the printer 3 selected in s44 so that the operator recognizes the record location of the image data.

FIG. 6 is a flow chart showing a fourth example of each processing procedure of the CPU 21 of the digital copying machine 2 included in the network system 1. In the explanation about the fourth example, the steps of executing the same processes as those in the flow chart shown in FIG. 2 are designated by the same step numbers and the detailed explanation thereof is omitted.

In this example, in the structure of the network system 1, a predetermined period during which the image data read by the digital copying machine 2 is stored in the image memory 31 of the printer 3 is preset, and the image data recorded in the image memory 31 of the printer 3 for a period of time exceeding the predetermined period is selectively deleted by the operator who executes the image recording of the image data.

Therefore, after the authentication of the user ID input by the operator is completed normally, the CPU 21 searches the image memory 31 of the printer 3 within the network system 1 for the image data to which the user ID is added (s1, s2→s51). If there is the corresponding image data, the CPU 21 reads a record time representing the record date and time at which the image data was recorded in the image memory 31 of the printer 3 (s52 and s53), calculates a record period representing a period of time from the record time to the current time (s54), and compares the calculated record period with the preset predetermined period (s55).

When the record period from the record time to the current time exceeds the preset predetermined time as a result of the comparison, the CPU 21 displays on the display 25b a message indicating that there is image data recorded over a long period of time and a message for requesting the deletion of the image data, and accepts an input of the operator's instruction for the image deletion (s56). When the operator gives an instruction to execute the image deletion, the CPU 21 sends a command to delete the image data to the printer 3 with the image memory 31 in which the image data is recorded (s57 and s58).

By the above processes of s51 to s58, unnecessary image data among the image data recorded in the image memory 31 of the printer 3 can be selectively deleted, thereby preventing the memory area of the image memory 31 of the printer 3 from being occupied by the unnecessary image data and allowing an effective use of the memory area of the image memory 3 for the processing function of the printer 3.

Incidentally, the record time data representing the date and time at which the image data was recorded in the image memory 31 can be created and added to the image data by the CPU 21 or stored in the RAM 28 together with a printer ID identifying a printer 3 to which the image data is to be sent when sending the image data from the digital copying machine 2 to the printer 3, or the record time data can be created and added to the image data by a control section of the printer 3 upon the receipt of the image data from the digital copying machine 2.

Besides, the above-mentioned predetermined period can be variably set with respect to the CPU 21, and the CPU 21 can store the set predetermined period in a predetermined memory area of the RAM 28.

Further, it is possible to display the contents of the image data on the display 25b when displaying the message in s56 to facilitate the operator's judgment as to whether the image data is image data to be deleted.

In this case, it is not necessarily for the operator to accurately read the contents of the image data if the operator can judge whether the image data displayed on the display 25b is to be stored or not. For instance, the display mode of the image data on the display 25b can be any of the following modes A, B and C. Namely, it is possible to select any of the plurality of modes.

In the mode A, only a part of the image data is displayed on the display 25b. The mode B displays the image reduced by a rate which is determined by the size of the image to be displayed on the display 25b and the size of a display area allocated within the screen of the display 25b. The mode C displays a title which is input by the operator in reading the image data or created automatically by the CPU 21 and assigned to the image data.

Furthermore, when there are a plurality of image data whose contents are similar to each other, it may be necessary for the operator to confirm the contents of the image data in detail, and the image data of a size which can ensure sufficient visibility may be displayed on the display 25b and scrolled on the display 25b.

Finally, in all of the above-described examples, the recording of the image data read in the image reading section 22 of the digital copying machine 2 in the image memory 31 of the printer 3 in the network system 1 is explained. However, if there is an external device having a memory equivalent to the above image memory as well as the printer, the image data can also be recorded in the memory of the external device in the same manner as above. Examples of such an external device include a personal computer and DVD (Digital Video Disk)-RAM.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A network system comprising:

reading out image data from a document by a digital copying machine during an image formation;

detecting whether there is a free space in an image memory of an external device;

adding to the image data identification data for identifying the image data read from a document by a digital copying machine to the image data during an image formation according to the image data of the document in the digital copying machine;

recording the image data with the added identification data in the image memory of the external device, which has a free space;

judging whether or not an image recording process for recording the image data in the image memory of the external device has been completed;

when the image recording process for recording the image data in the image memory of an external device is not completed, executing again reading of the image data from the document in the digital copying machine and the image recording process to another external device; and reading out the recorded image data according to the identification data.

2. The network system as set forth in claim 1, wherein the identification data includes a user identification code for identifying an operator who operates the digital copying machine.

3. The network system as set forth in claim 1, wherein the detection of a free space in the image memory is performed according to a priority order which is set for each of a plurality of external devices in advance.

4. The network system as set forth in claim 1, wherein a data volume of the image data of the document is calculated in advance, and the image data is recorded in an image memory having a free space more than the calculated data volume.

5. The network system as set forth in claim 1, wherein a record period from a record time of the image data recorded in the image memory of the external device to a current time is compared with a preset predetermined period, and image data whose record period exceeds the predetermined period is selectively deleted.

6. The network system as set forth in claim 1, wherein a relation between data that is used to identify the document and data that is used to identify an external device of a receiver is stored in the digital copying machine.

7. The network system as set forth in claim 1, wherein, when the image memory of a single external device fails to store all of the image data that was read out from plural pages of each document, the image data is read again with respect to all of the plural pages of each document so as to record the image data of the plural pages of each document in a single image memory.

8. Digital apparatuses interconnected by a network, comprising:

a digital copying machine for reading image data from a document and forming a copy of the document according to the image data;

an external device having an image memory for storing the image data;

a data transmission line for interconnecting said digital copying machine and said external device;

a detecting section for detecting a free space in the image memory of said external device;

an adding section for adding identification data for identifying the image data read from the document by said digital copying machine to the image data during an image formation according to the image data of the document in said digital copying machine;

a control section for controlling said digital copying machine and said external device to record the image data with the added identification data in the image memory of the external device, which has a free space larger than a data volume of the image data; and a judging section for judging whether or not the image memory of a single external device fails to store all of the image data that was read out from plural pages of each document, wherein when the judging section judges that the image memory of a single external device fails to store all of the image data that was read out from plural pages of each document, the image data is read again with respect to all of the plural pages of each document so as to record the image data of the plural pages of each document in a single image memory, and the recorded image data is read out according to the identification data.

9. The digital apparatuses interconnected by a network as set forth in claim 8, wherein said detecting section, adding section and control section are provided in said digital copying machine.

10. The digital apparatuses interconnected by a network as set forth in claim 8, wherein said external device is a printer.

11. The digital apparatuses interconnected by a network as set forth in claim 8, comprising:

a storage section which stores in a digital copying machine a relation between data that is used to identify the document and data that is used to identify an external device of a receiver.

* * * * *